(12) United States Patent (10) Patent No.: US 7,479,980 B2
Merheim et al. (45) Date of Patent: Jan. 20, 2009

(54) MONITORING SYSTEM

(75) Inventors: Christian Merheim, Helsingborg (SE); Andreas Rodman, Helsingborg (SE); Dan Hovang, Lund (SE); Mats Elfving, Lund (SE); Peter Gustavsson, Lund (SE); Alexander Lidgren, Mulmo (SE)

(73) Assignee: Wespot Technologies AB, Lund (SE)

( * ) Notice: Subject to any disclaimer, the term of this patent is extended or adjusted under 35 U.S.C. 154(b) by 1147 days.

(21) Appl. No.: 09/746,776

(22) Filed: Dec. 22, 2000

(65) Prior Publication Data

US 2002/0135483 A1 Sep. 26, 2002

Related U.S. Application Data

(60) Provisional application No. 60/177,305, filed on Jan. 21, 2000.

(30) Foreign Application Priority Data

Dec. 23, 1999 (SE) .................................. 9904741

(51) Int. Cl.
*H04N 7/18* (2006.01)
(52) U.S. Cl. .................................................... 348/152
(58) Field of Classification Search ................ 348/143, 348/152–156, 159, 161, 170, 148, 166; 345/581, 345/521, 441; *H04N 7/18*
See application file for complete search history.

(56) References Cited

U.S. PATENT DOCUMENTS 4,651,143 A * 3/1987 Yamanaka ................ 340/691.1

(Continued)

FOREIGN PATENT DOCUMENTS

EP 0090395 10/1983

(Continued)

OTHER PUBLICATIONS

G. L. Foresti, *Object Recognition and Tracking For Remote Video Surveillance*, IEEE Transactions On Circuits And Systems For Video Technology, vol. 9, No. 7, pp. 1045-1062 (Oct. 1999).

(Continued)

*Primary Examiner*—Tung Vo
(74) *Attorney, Agent, or Firm*—Birch, Stewart, Kolasch & Birch, LLP

(57) ABSTRACT

A method of monitoring monitored locations by means of a monitoring system. The monitoring system comprises a plurality of monitoring modules 1, each of which has a light-sensitive sensor for monitoring the monitored locations. The monitoring system further comprises a remote monitoring station 3 with an operator. The method comprises the steps of recording by each of the monitoring modules 1 an image of the monitored location associated with the monitoring module 1, extracting in each of the monitoring modules an area in the recorded image that differs from a reference image, and extracting in each of the monitoring modules an object from the area. The method further comprises classifying in each of the monitoring modules 1 the object based on characteristics, such as a characteristic of the type: size, shape and/or movement history, associated with the object, if the object is a human alarm object, and, if the object is classified as a human alarm object, transmitting data representing the area in a stylized way to the monitoring station 3, and recreating said transmitted data in the monitoring station 3 and displaying the same to the operator for verification of the human alarm object.

11 Claims, 10 Drawing Sheets

U.S. PATENT DOCUMENTS

| | | | |
|---|---|---|---|
| 4,679,077 A * | 7/1987 | Yuasa et al. | 348/154 |
| 5,097,328 A * | 3/1992 | Boyette | 348/150 |
| 5,555,512 A | 9/1996 | Imai et al. | |
| 5,666,157 A | 9/1997 | Aviv | |
| 5,847,755 A | 12/1998 | Wixson et al. | |
| 5,917,958 A * | 6/1999 | Nunally et al. | 382/276 |
| 5,926,209 A * | 7/1999 | Glatt | 348/143 |
| 5,963,272 A | 10/1999 | Wixson | |
| 6,088,484 A * | 7/2000 | Mead | 382/232 |
| 6,097,429 A * | 8/2000 | Seeley et al. | 348/154 |
| 6,271,752 B1 * | 8/2001 | Vaios | 340/541 |
| 6,424,370 B1 * | 7/2002 | Courtney | 348/143 |
| 6,690,411 B2 * | 2/2004 | Naidoo et al. | 348/143 |
| 6,774,905 B2 * | 8/2004 | Elfving et al. | 345/581 |
| 2003/0048356 A1 * | 3/2003 | Kohno et al. | 348/143 |

FOREIGN PATENT DOCUMENTS

| | | |
|---|---|---|
| EP | 0445334 | 9/1991 |
| EP | 0805426 | 5/1997 |
| EP | 0986036 | 3/2000 |
| GB | 2282294 | 3/1995 |
| WO | WO9828706 | 7/1998 |

OTHER PUBLICATIONS

M. Meyer, *A New System For Video-Based Detection Of Moving Objects And Its Integration Into Digital Networks*, Security Technology—30th Annual International Carnahan Conference., pp. 105-110 (Oct. 1996); and Abstract from IEEE XPLORE website.

E. Stringa et al., *Content-based Retrieval And Real Time Detection From Video Sequences Acquired By Surveillance Systems*, IEEE Image Processing Proceedings—1998 International Conference, pp. 138-142 (1998).

Patent Abstracts of Japan, Publication No. 06-223190, Dec. 8, 1994.

Patent Abstracts of Japan, Publication No. 09-050525, Dec. 8, 1994.

* cited by examiner

MONITORING SYSTEM

CROSS REFERENCE TO RELATED APPLICATION

This application claims the benefit of U.S. Provisional Application No. 60/177,305, filed Jan. 21, 2000.

TECHNICAL FIELD

This invention relates to a method of monitoring a monitored location, a monitoring system and a monitoring module for monitoring.

BACKGROUND ART

Monitoring of various public places, business premises and private homes is becoming increasingly important as they contain increasingly valuable equipment, both of economic value, such as expensive computer equipment, and sentimental value, such as family heirlooms.

In order to meet these increased monitoring needs, there are different types of monitoring systems. One type of monitoring system according to prior art normally comprises a monitoring station and a number of monitoring modules, each of which monitors a monitored location. Each monitoring module is connected to a monitoring station via communication cables. Traditionally, a monitoring module is a video camera which continually records images which are transmitted to the monitoring station. In the monitoring station there are one or more alarm operators, who watch the transmitted images to decide whether any unauthorized activity is taking place, such as a burglar appearing at the monitored location. The disadvantage of this system is that the alarm operators must be paying attention continuously if there is anyone in the transmitted images. This severely limits the number of monitoring modules that can be connected to the monitoring station, which also results in the monitoring being very expensive. In order to reduce the quantity of images transmitted to the monitoring station, the monitoring module comprises a video camera and an infrared detector which are connected to each other. When the infrared detector detects a movement, a video recording is started. The video images can be transmitted via the communication cables to the monitoring station where an operator views the images and makes a decision regarding measures to be taken. A problem with this type of monitoring system is that in many cases the recorded images do not provide sufficient information about what has caused the alarm. This can occur when, for example, alarm situations, detected by the infrared detector, which have been caused by high temperatures or sabotage are not caught by the camera. In addition, the system still transmits a relatively large quantity of data.

Patent application WO 98/28706 describes a monitoring system which comprises a number of cameras that are connected to a monitoring station. The cameras record images that are transmitted to the monitoring station. The monitoring station processes the images to determine whether there is an alarm situation or not. If it is determined that there is an alarm situation, an alarm signal is forwarded.

SUMMARY OF THE INVENTION

An object of the invention is therefore to make possible reliable and cost-effective monitoring and thereby to solve the above-mentioned problem.

The monitoring system must also in a completely satisfactory way make it possible to protect the privacy of persons who are at the monitored location.

The characteristics which belong to the extracted area can be calculated from data which represents the stylized area.

These and other objects, which will become apparent from the following description, have now been achieved by a method of monitoring in accordance with claim 1.

The invention is based on the knowledge of the advantages of working with objects which are extracted from an area. The area is a representation of an object which is detected at a monitored location. The object is created by producing some particular characteristics of the area, such as a stylized outline shape of the area. In other words, the object contains a reduced and limited amount of information about the area, which information is sufficient to ensure whether there is an alarm situation or not. By working with objects it is possible to create a first type of object which is used for classification and a second type of object which is transmitted to a monitoring station for visual verification. These two types of object consist of the actual object or a subset of the actual object. In this way, classification of certain characteristics and a visual verification of other characteristics are made possible.

According to one aspect, the invention thus comprises a method of monitoring monitored locations by means of a monitoring system comprising a plurality of monitoring modules, each of which has a light-sensitive sensor, for monitoring the monitored locations, and a remote monitoring station with an operator, comprising the steps of recording by each of the monitoring modules an image of the monitored location associated with the monitoring module, extracting in each of the monitoring modules an area in the recorded image which differs from a reference image, extracting in each of the monitoring modules an object from the area, classifying in each of the monitoring modules the object, based on characteristics, such as a characteristic of the type: size, shape and/or movement history, associated with the object, if the object is a human alarm object, transmitting, if the object is classified as a human alarm object, data representing the area in a stylized way to the monitoring station, and recreating said transmitted data in the monitoring station and displaying the same to the operator for verification of the human alarm object.

Thus, the invention comprises the step of recording images of a monitored location and of producing from these images information which is of interest for monitoring purposes and transmitting certain information to a monitoring station.

The monitored location is limited by the light-sensitive sensor and the field of vision of the associated optics. The monitoring station is remote and can be a center belonging to a security company. Security personnel is then sent to the monitored location immediately if an alarm is verified. The monitoring station can also, for example, be connected directly to the police.

The recorded image is compared with a reference image to detect new objects and events in the image. The reference image can be created by means of one or more algorithms from one or more previous images, one or more background images, or a combination of both. Averaging can be carried out of a number of said recorded images to create a reference image. By means of the comparison, moving objects can be further processed and stationary objects, for example tables and chairs, that are in the monitored location can be excluded. This means that the areas contain interesting information about events in the monitored location.

From the areas in the image which are different from the reference image, at least one characteristic is produced to create an object. The characteristic should be of such a type that it is of interest to study in the relevant monitoring situation. For example, if it is necessary to be able to distinguish between animals and people, certain specific characteristics, such as patterns of movement, can suitably be used. An object is created. A classification based on one or more characteristic is carried out to determine whether the object is a human alarm object. The monitoring system can be set up to classify the object as a human alarm object as soon as an object is determined to be a human object, but it can also be set up to classify the object as a human alarm object if the object is determined to be human and also fulfils some additional criterion, such as where in the image the human object is located.

The decision can be reached based on a comparison with predetermined threshold values and/or on characteristics of previously detected objects.

The stylized depiction of the object that is transmitted when the object is classified as a human alarm object is suitable for narrow-band transmission while at the same time being able to be interpreted by the human eye for a verification that it is actually an alarm object. Data representing the stylized object comprises greatly data-reduced information about the extracted area. The data-reduced information still comprises sufficient information to enable it to be recreated in the monitoring station and displayed visually in such a way that an operator can verify reliably that there is actually an alarm situation at the monitored location. An operator can, for example, be a security guard or some other person who, in the event of an alarm being verified, contacts, for example, a security guard or the police.

Data representing the area in a stylized way is transmitted via a communication medium, which can be, for example, a cable or a wireless connection, to a monitoring station. The object can be displayed to the operator on, for example, a display screen. The operator thus makes an evaluation of what he sees. If the operator, for example, judges that there is an intruder at the monitored location, he takes suitable measures, such as sending security personnel to the location. On the other hand, if the operator judges that what he can see is not an alarm situation, no further action need to be taken and money is saved, as no unnecessary work needs to be carried out. In addition, the transmission medium is not overloaded with superfluous data, as the transmitted object comprises a reduced and limited amount of information about the detected area. This means that a very large number of monitoring modules can be connected to one monitoring station. Analysis and decision-making are distributed. All computer-based analysis takes place in the monitoring modules and it can be sufficient to have only human verification of the transmitted information in the monitoring station. In addition, with the limited amount of information it is easy to construct a queue system for the received alarm information in the monitoring station.

The characteristics on which the classification is carried out can be calculated from data representing the stylized area. The advantage of this is that the operator verifies the decision whether there is an alarm situation or not using the same characteristics to make his decision as the decision engine in the monitoring module.

In one embodiment, the step is included of creating the outline shape of the area in order to represent the area in a stylized way.

The outline shape can be made up of a sequence of points in the edge of the area. Data about the size and shape of the area can be calculated relatively easily from the outline shape.

In one embodiment, the stylized area is a stylized outline shape.

With the stylized outline shape, the quantity of data can be reduced as it does not comprise all the points in the edge of the area. Different algorithms can be used in order to produce the stylized outline shape. In the monitoring station there must be certain corresponding algorithms so that the outline shape can be recreated and displayed visually.

Data representing the stylized outline shape is transmitted. In the monitoring station the stylized outline shape is recreated and displayed to the operator. The advantage of transmitting a set of data for the stylized outline shape is that it can be transmitted by narrow-band. The transmission can be carried out on a communication medium that has a bandwidth of less than 10 kbit/s. In addition, the identity of the human-related alarm object is transmitted anonymously and is protected. Problems can arise when a monitoring module sends an image of the monitored location to the monitoring station, as special permission is often required to use such a monitoring module in order to protect personal privacy. It can be difficult and complicated to obtain such permission. Monitoring modules in ordinary homes can also impose requirements associated with personal privacy. It is usually not desirable for people who live in the home which is monitored to be recorded on images, among other things as these images could be misused.

The outline shape can be a good characteristic to make possible visual verification in the monitoring station as to whether there is an alarm situation or not.

The outline shape of a human-related object is relatively easy for an operator to recognize as a human figure, without the identity of the person being disclosed.

In another preferred embodiment, the step is included of comparing particular characteristics belonging to the object with corresponding characteristics belonging to an object extracted out of a previously recorded image, in which case if the characteristics conform to the extent that they can be considered to belong to the same object, data is recorded about the associated movement history of the object for classification and/or transmission to the monitoring station to be recreated and displayed to the operator.

If the compared characteristics conform to a certain predetermined extent, they are said to match and to originate from the same moving object, recorded at different times. For example, characteristics of the distinct region can be compared, such as its physical size in the image. For example, speed and direction of movement can be worked out. As the history of the object is known, it can be used as a characteristic on which to base decisions. The movement history can be displayed in the monitoring station, together with the stylized outline shape, as vectors which show the direction of movement and the speed.

An advantage of displaying the movement history to the operator is that the decision regarding whether there is an alarm situation or not is made easier. The movement history which is displayed can also be an animation of outline shapes originating from objects extracted consecutively in time and representing the same extraneous object. The operator's evaluation of the alarm situation is made considerably easier when the pattern of movement associated with the object is displayed. For example, verification of persons becomes relatively simple, as they have a particular pattern of movement. An operator is able to analyze movement information which comes from a very large number of monitoring modules.

One embodiment further comprises, the steps of transmitting, if the object is classified as a human alarm object, supplementary alarm information about the area, such as information of the type: intensity regions and/or line content, together with data representing the area in a stylized way, and recreating and displaying the transmitted supplementary alarm information.

The intensity regions make easier in particular the visual verification in the monitoring station, as the intensity regions make the display of the object clearer. This applies in particular when the object is human-related. For example, a darker lower part of the object displayed to the operator can represent trousers/skirt, which makes possible an easier interpretation. If it is the object's associated outline shape which is displayed, it can be filled in in a suitable way.

Partial lines within the area are extracted. The line content gives the object more structure and provides essential information about the texture of the object. Examples of partial lines in a person can be that the chin is added so that the head is regarded as part of the rest of the body.

With a visual display in the monitoring station the partial lines make the decision-making concerning the alarm situation easier for the operator. It is easier to make out what the outline shape represents.

According to a second aspect of the invention, this comprises a monitoring system for monitoring monitored locations, comprising a plurality of monitoring modules, each of which has a light-sensitive sensor for recording images of the monitored location, and a remote monitoring station, the monitoring modules being arranged to carry out computer-based analysis of the images, which comprises extracting areas from the images which differ from a reference image, extracting an object from the area, classifying the object based on characteristics associated with the object, such as a characteristic of the type: size, shape and/or movement history, and, if the object is classified as a human alarm object, transmitting data representing the area in a stylized way to the monitoring station, which is arranged to recreate and display said transmitted data to the operator for verification of the human alarm object.

A further advantage of having analysis and decision-making in the monitoring module is that more reliable sabotage protection is achieved. If the monitoring is only carried out with a camera that forwards the image to a monitoring station, a burglar can, for example, cut the connection to the monitoring station, which means that no information about the burglary can be obtained. If a burglar sabotages the connection between the monitoring module and the monitoring station in a monitoring system according to the invention, the monitoring module continues to record images and analyze these, and if there is an alarm situation the monitoring module can store the alarm object in its memory. In this way, the burglary can be recorded and information about the burglary can be retrieved from the monitoring module or sent when the connection is restored. The monitoring station can indicate that the connection with a monitoring module is broken and an operator can go to the monitored location in question and investigate whether the broken connection is due to sabotage. In addition, the operator can retrieve any stored alarm object from the monitoring module and in this way know whether there has been a burglary, for example. The monitoring module can also be arranged to store an image if the connection is broken and an alarm object is detected. The information which is stored requires little memory space, as not all the recorded images need to be stored, only data representing the alarm object, and possibly some individual images. With traditional monitoring techniques it would not be possible to store the recorded images in the camera as this would be too memory-intensive.

Further advantages of the monitoring system are apparent from the above discussion of the method.

In one embodiment, the monitoring system comprises a central panel which is arranged to receive from at least one subset of the monitoring modules said data representing the area in a stylized way, and to forward this data to the monitoring station, together with supplementary data such as data of the type: date, time and information about from which monitoring module said data was received.

The central panel can, for example, be located at an entrance to a building and also have the function of being able to activate and deactivate the monitoring modules. There can be a large number of central panels connected to the monitoring station. No processing of the received data is normally carried out in the central panel, except for the addition of extra information which can be of use to the operator in the monitoring station.

In another embodiment according to the invention, the monitoring modules and the monitoring station are arranged to communicate by wireless means, such as by mobile telephony.

In wireless communication, the bandwidth for the transmission is particularly critical. With wireless communication no extra cable-laying is required, which reduces the costs. The monitoring station can, for example, be a mobile terminal. An advantage of this is that the operator does not need to remain in one particular place. The mobile terminal can, for example, be a mobile phone. As it is possible to show a simple object on a mobile phone's display, the operator can view the object on the mobile phone's display and can determine whether there is an alarm situation and based on this can take any measures. This means, for example, that the operator can carry out other tasks between alarm situations and when an alarm situation arises he is informed of this, for example, by means of an audio signal.

The monitoring station can also be a server to make possible monitoring via a computer network. As no decision needs to be taken by the monitoring station itself, this can be a server. An operator can monitor from anywhere in the world, provided he has access to a network connection.

According to a third aspect of the invention, this comprises a monitoring module for monitoring a monitored location, which comprises a light-sensitive sensor for recording an image of the monitored location, which monitoring module is arranged to carry out computer-based analysis of the image, which comprises extracting an area from the image which differs from a reference image, extracting an object from the area, classifying the object based on characteristics associated with the object, such as a characteristic of the type: size, shape and/or movement history, and, if the object is classified as a human alarm object, transmitting data representing the area in a stylized way to an external unit.

With the monitoring module the same advantages are obtained as have been discussed above in connection with the claims concerning the method and the claims concerning the system. In addition, the following is achieved.

In a preferred embodiment, the memory is arranged to store a particular type of movement information for learning purposes.

This has the great advantage that the monitoring module becomes better at ignoring false alarms and learns what does not give rise to an alarm situation. The saved movement information can, for example, be movement detected outside a window. Perhaps people often walk past, and are not objects that are to give rise to an alarm situation. This type of recurring movement in this area will then not give rise to an alarm situation.

In one embodiment, a supplementary sensor is used which makes possible even more reliable monitoring. The accuracy of the whole system is thereby increased. The supplementary sensor can, for example, be an infrared detector. The infrared detector extends the monitored wavelength range. For example, it can be a useful addition when an alarm object is wearing clothes which match the background in pattern and color, which can cause problems for the light-sensitive sensor. The infrared detector will then detect the object from the heat it is emitting.

BRIEF DESCRIPTION OF THE DRAWINGS

In the following, the invention will be described in greater detail utilizing an example of an embodiment and with reference to the accompanying schematic drawings, which illustrate a currently preferred embodiment of the monitoring system according to the invention.

DESCRIPTION OF A PREFERRED EMBODIMENT

Figure 1:
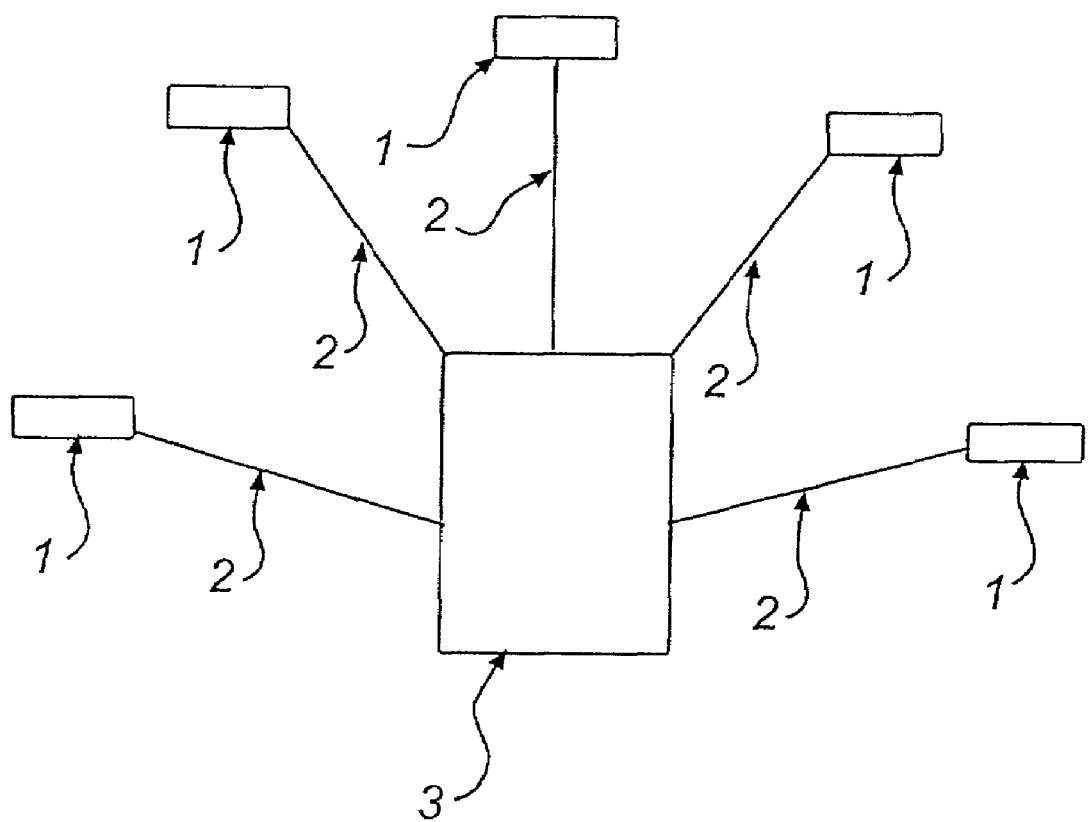
FIG. 1 shows a schematic diagram of the monitoring system according to one embodiment.

FIG. 1 shows schematically a monitoring system with a number of monitoring modules 1 which can communicate with a monitoring station 3 via a transmission medium 2.

Figure 2:
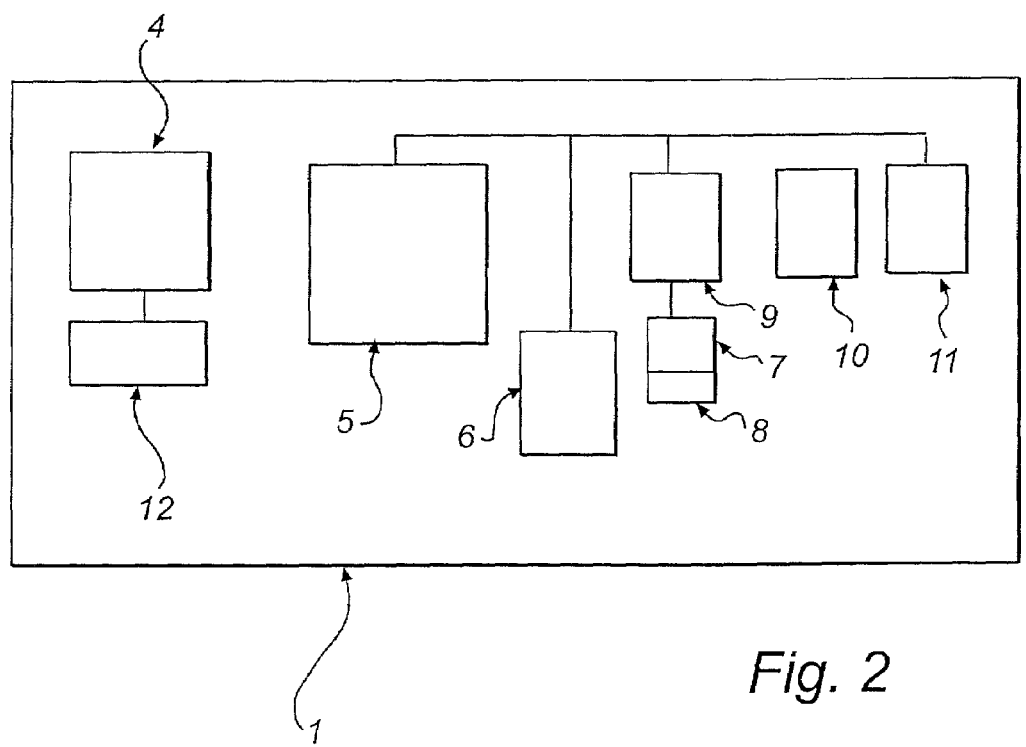
FIG. 2 shows a schematic block diagram of the hardware in the monitoring module according to one embodiment.

FIG. 2 shows a block diagram of the hardware in the monitoring module 1. The monitoring module 1 is supplied with a voltage to a voltage connection 4. In addition, the monitoring module 1 comprises a powerful calculating unit 5. The monitoring module 1 comprises a communication unit 6. In addition, the monitoring module 1 comprises a light-sensitive sensor 7, for example a CMOS sensor, for recording images. The sensor 7 is integrated into a chip and also has a lens arrangement 8. The sensor 7 provides an analogue output signal which is forwarded to an A/D converter 9 for conversion into a digital signal. In addition, the monitoring module 1 comprises a random access memory 10. The monitoring module 1 operates with a suitable operating system and can carry out advanced image processing. The monitoring module 1 also comprises a permanent memory 11 for computer code and other data which has to be saved in a non-volatile memory. In addition, a lighting device 12 can be arranged in association with the monitoring module 1 to illuminate dark monitored locations. The lighting can advantageously be carried out in the infrared range as the monitoring module 1 will then not emit any visible light, which will make it very difficult to find in dark monitored locations. This results in increased reliability, as the danger of sabotage is reduced. Infrared diodes are also cheap and do not use much power. The monitored location is limited by the field of vision of the sensor 7 and its associated optics. All the components comprised in the monitoring module 1 are advantageously integrated on a circuit board. The advantage of this is that the monitoring module 1 is much more stable, that is it is much less sensitive to interference and has fewer points where sabotage can occur.

The alarm criteria of the monitoring module 1 are stored in the permanent memory 11 and can be changed from the monitoring station 3 by the transmission of new software from the monitoring station 3 to the monitoring module 1. The alarm criteria can be different for different monitoring modules 1. The alarm criteria can be changed dependent upon the permitted power consumption and external conditions. The external conditions can, for example, be a monitor that is switched on, curtains that move or other permitted movements that take place at the monitored location. The alarm criteria are, of course, also set in accordance with the type of object and/or pattern of movement for which the monitoring module 1 is to give an alarm.

Figure 3:
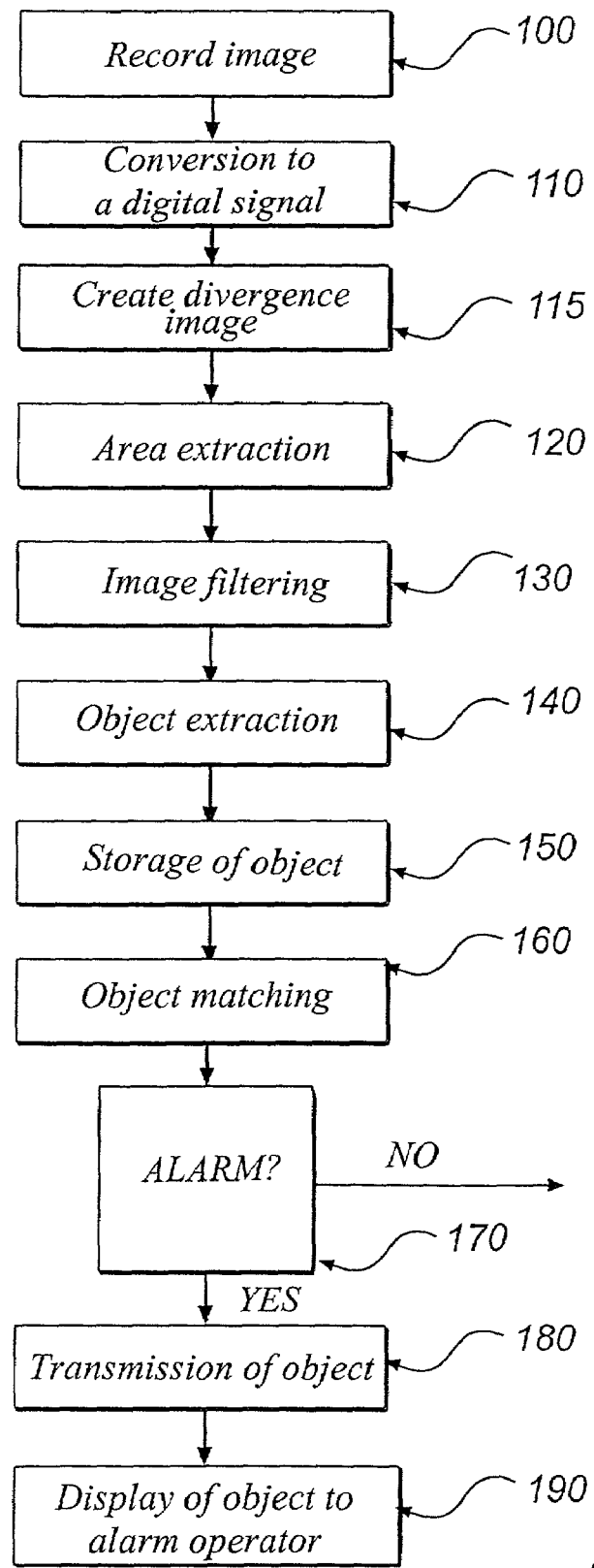
FIG. 3 shows a flow chart of a method of monitoring according to one embodiment.
Figure 8:
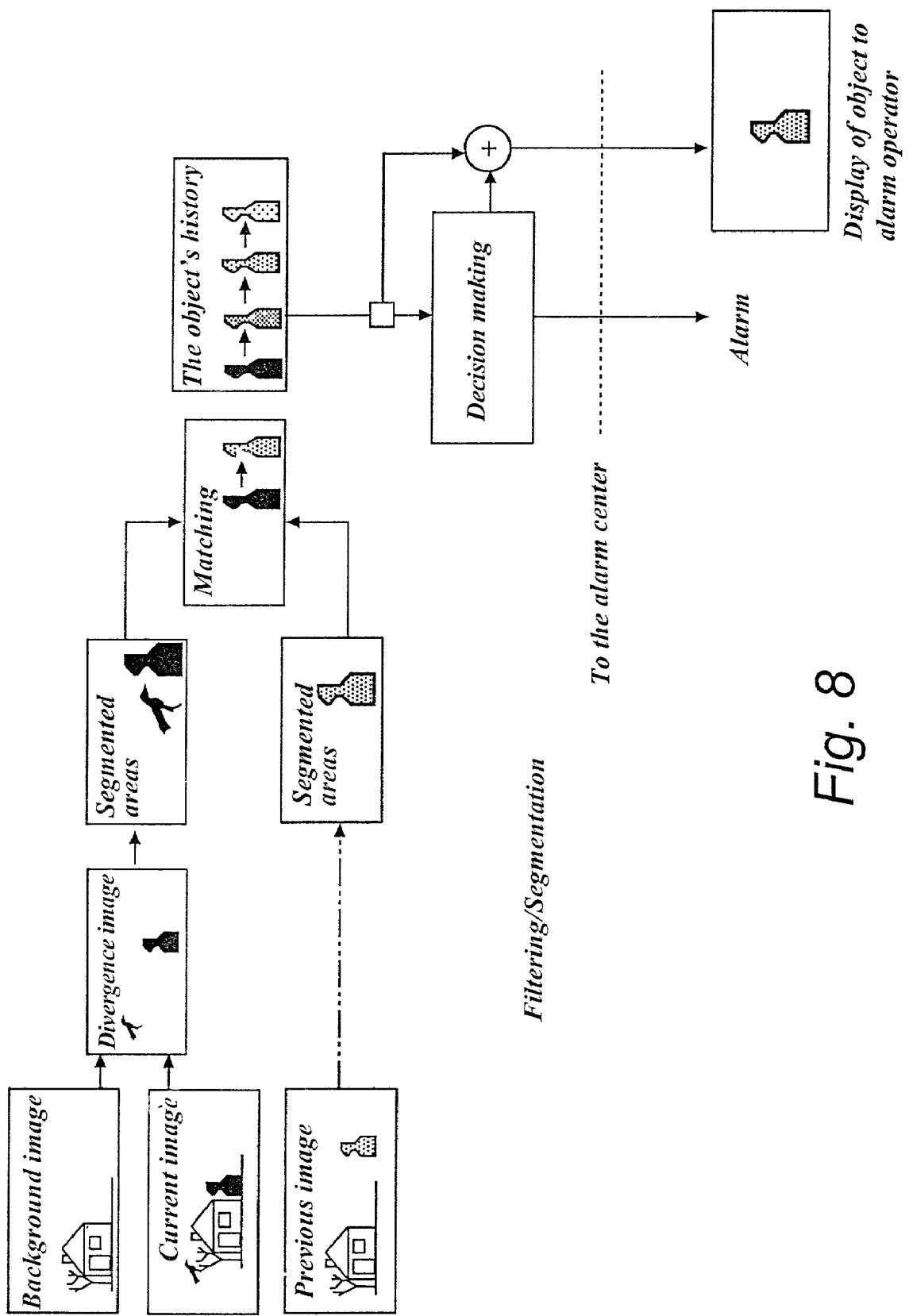
FIG. 8 shows a general block diagram of an embodiment of the method of monitoring.

With reference to FIG. 3 and FIG. 9, the monitoring function of the monitoring module 1 will now be described. In a recording step 100, the sensor 7 continually records images of the monitored location. A recorded image is converted in a conversion step 110 from an analog signal to a digital signal in the A/D converter 9. In the calculating unit 5 a difference image is created in a difference step 115 by a subtraction between a reference image and the recorded image in question. The reference image can be created using one or more algorithms from one or more previous images, one or more background images or a combination of both. Averaging or Kalman filtering can be carried out on a number of said recorded images to create a reference image. The reference image is normally updated at regular intervals. Areas are extracted from the difference image in an area extraction step 120, for example by refining the difference image, and we get what we call a divergence image which is shown in FIG. 8. The resulting areas consist of a defined number of pixels in the recorded image. Several areas are mutually exclusive so that a particular pixel can only belong to one area. Areas represent a change of some kind that has occurred in the recorded image in comparison with the reference image. These changes can, for example, be that a person has entered the monitored location, a bird has flown into the monitored location or a tree is blowing in the wind in the monitored location. In a filtration step 130 a conventional image filtration can be carried out to remove noise. When the areas have been extracted, an object is associated with each area in an object extraction step 140 for easier management of the different areas. Instead of storing images of an area, selected area characteristics are stored, such as one or more of, for example, coordinates in the image, size, outline, average intensity, circumference and intensity variations.

Figure 4:
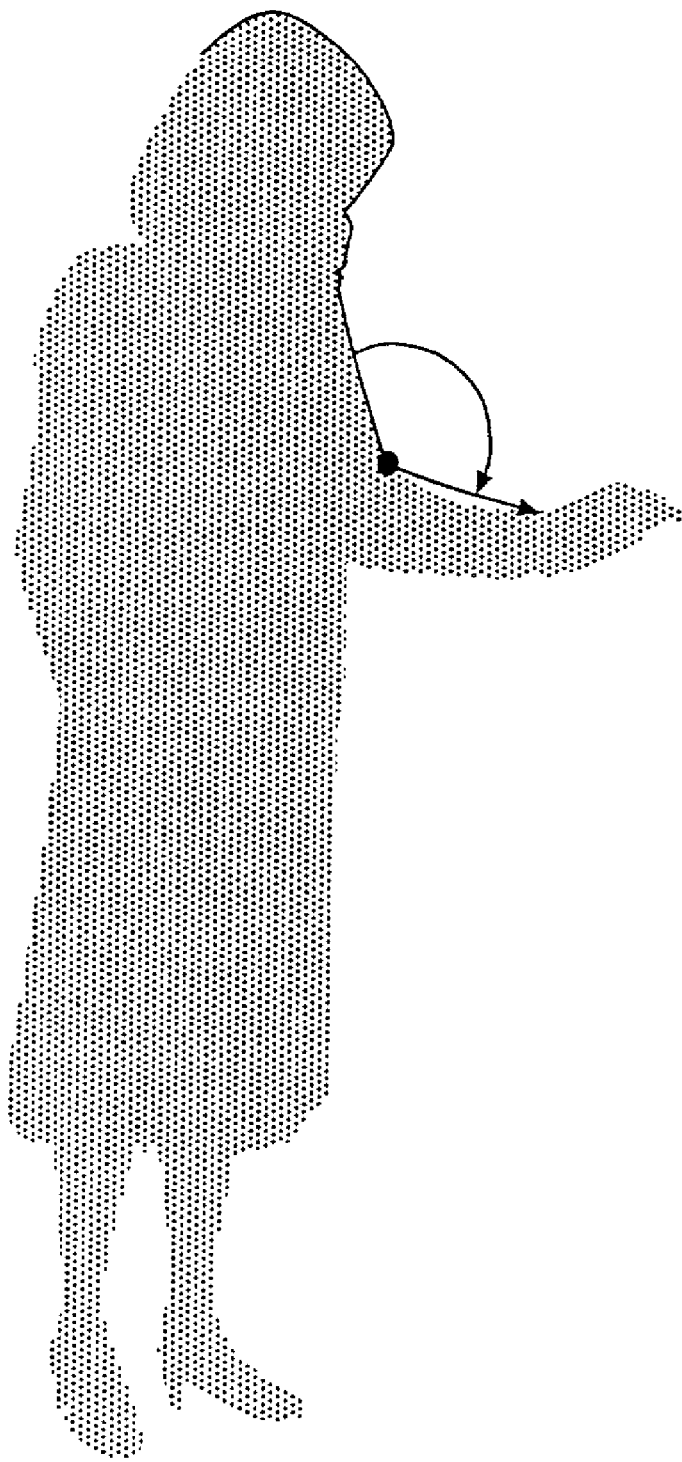
FIG. 4 shows how the edge of an area is traced out according to one embodiment.
Figure 5:
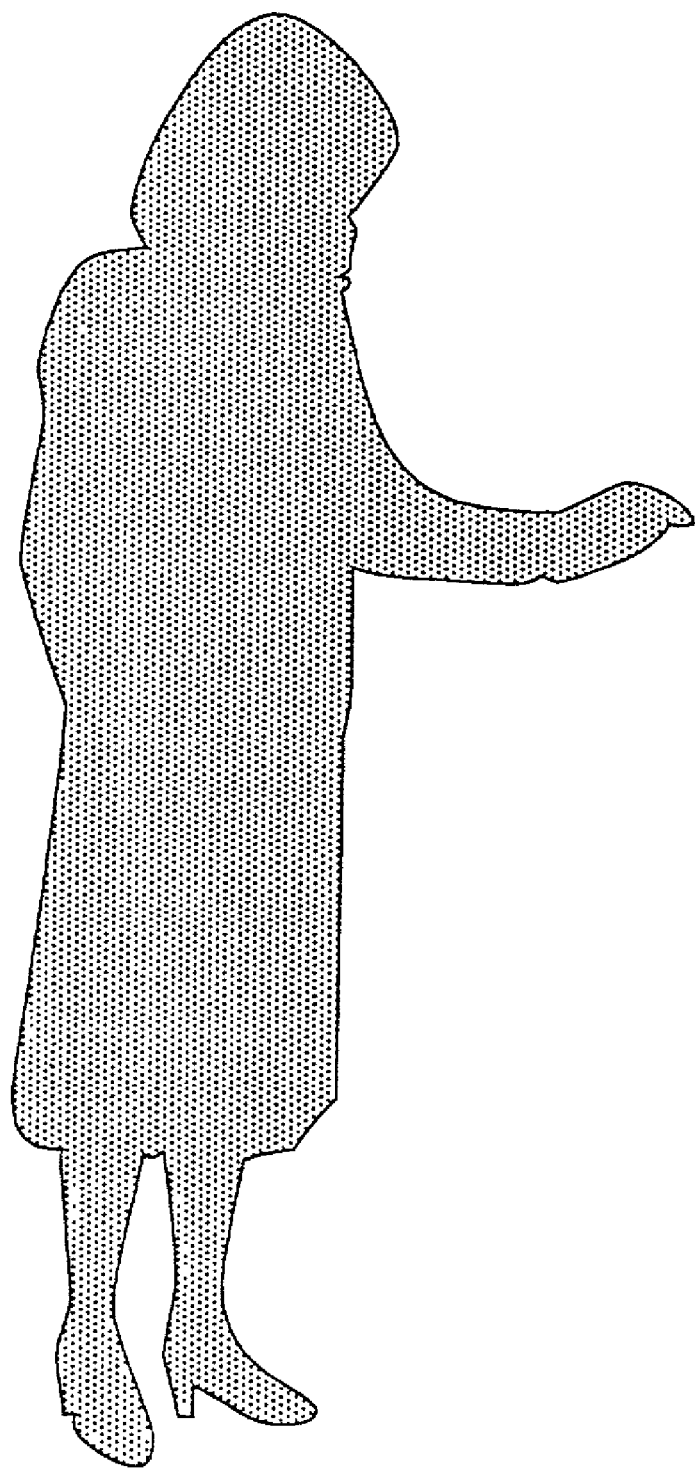
FIG. 5 shows a line image in which all the edge points for the area are to be found according to one embodiment.
Figure 6:
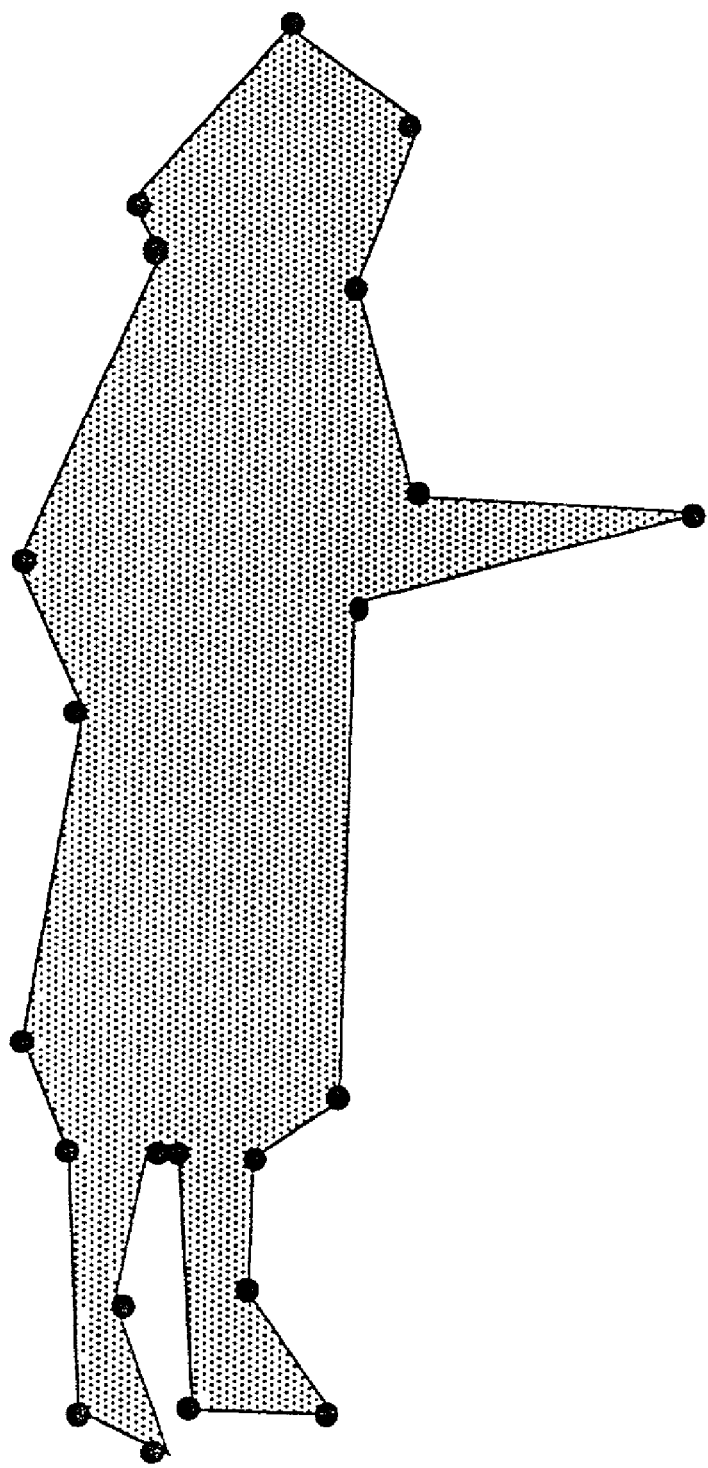
FIG. 6 shows a polygonized image according to one embodiment.

With reference to FIGS. 4-6, a method will now be described of producing the outline of the area, which area in this case represents a person. FIG. 4 shows how an extracted area is traced out along its edge by a search function which has a clock-hand algorithm. The clock-hand algorithm traces along the edge of the area until it reaches the point where it started. In detail, the following takes place. A starting point is first looked for on the edge of the area. As long as no start node is encountered and there are unexplored ways forward, a clock-hand is moved clockwise at a distance of one pixel from the previous position until a new edge point is encountered. If the clock-hand's new position is the start position, then a new unexplored way is looked for. If there is no way forward, the algorithm is to be discontinued. Otherwise the algorithm continues and the unexplored way forward from the start node which was found is marked as explored.

FIG. 5 shows an outline of an area which represents a person. In FIG. 6 a polygon has been fitted to the traced-out path. The polygon is adjusted using an angle-minimizing function. The angle-minimizing function is as follows. A starting point is set on the edge as the most recent point. As long as the end point is not encountered, then the edge is traced out. The angle difference between the tangent vector of the most recent point and the tangent vector of the present position around the edge is calculated. If the angle difference is greater than a particular limit, then this position is saved as a node, and the position is set as the most recent point. It is also possible to use other types of outline shapes than polygons, for example, splines. A spline curve is defined mathematically by a number of control points and a function which describes the appearance of the curve between the control points. Normally, the function is fixed and only the control points are used to define the curve. To fit such a curve to an outline image it is necessary to have an initial value, a criterion for where the curve fits the outline and a search strategy to fit the curve to the outline. Normally, the position of the curve in the previous image in a sequence of images is used as an initial value. If starting from scratch, another method must be used, for example by starting with a large circle that is guaranteed to include the outline. The criterion for fitting the curve to the outline can be either the distance to the detected outline or based on the gradient in the image. In the latter case, it is required that the curve should be placed where the gradient is the greatest. The search strategy consists normally of some standard optimization method in order to minimize the criterion in the search strategy. The advantage of a spline representation for optimization is that only the control points need to be used as variables, which leads to increased speed. For more details about spline fitting, see the article "Fast least-square curve fitting using quasi-orthogonal splines", Myron Flickner, James Hafner, Eduardo J. Rodriguez and L. C. Sanz.

After combining the object's characteristics the object is stored in a storage step 150 in the form of its characteristics in the random access memory 10 and a matching of the object with a stored object from a previously recorded image is carried out in a matching step 160. The objects' characteristics are compared with each other to produce an indication of how well they conform. By minimizing the matching difference for all objects at the same time, a good approximation is obtained of the object's previous history, which is known as tracking. Matching is carried out by gradual stages in such a way that it is only the object in the most recent image that is compared with what was stored from the previous image or, alternatively, from earlier images. After matching it can be seen for a particular object whether the object was recorded in a previous image and if so which object it was in the preceding image. As the previous object possibly in turn has a direct connection to the previous object, a chain is built up of the total history of the current object.

Figure 7:
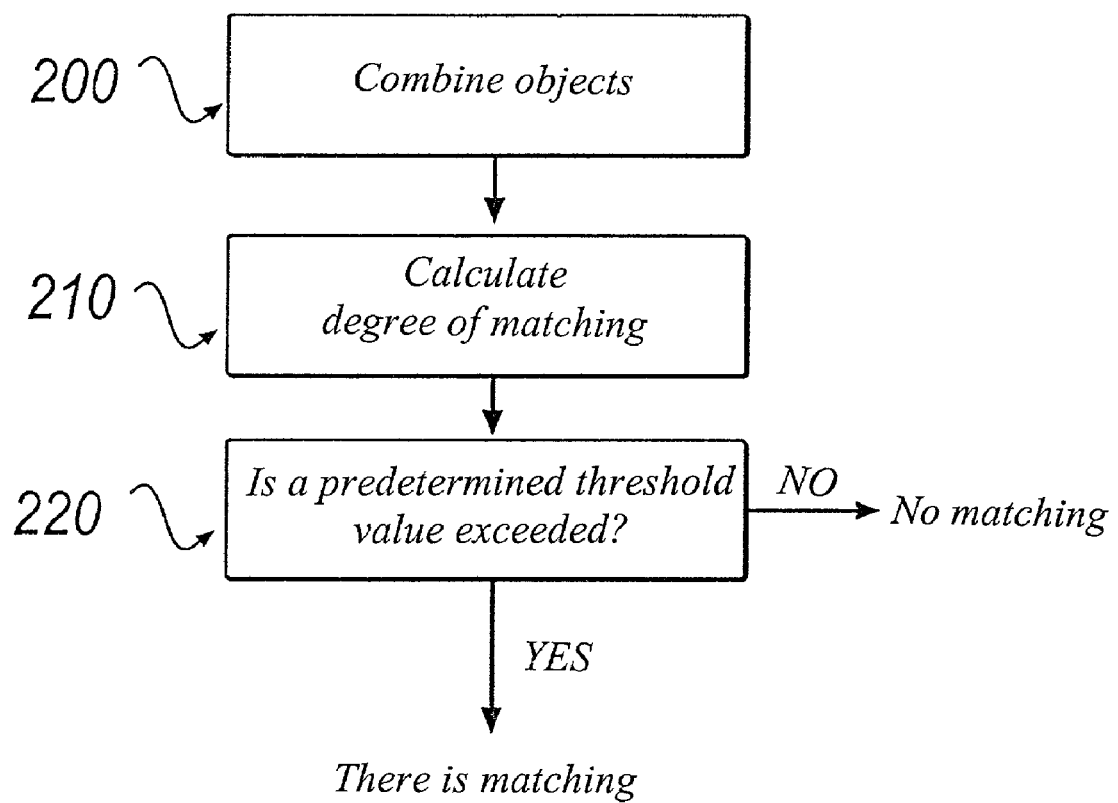
FIG. 7 shows a flow chart for matching an object according to one embodiment.

The matching method is illustrated in FIG. 7 and comprises the following. The object is compared with all previous objects which were extracted from the previous image in a combining step 200. A calculation of the degree of matching of the combinations is carried out in a calculation step 210. The outcome of the calculation of the matching is normalized so that the result is a value between 0 and 1. The value 0 indicates that the compared objects do not have any characteristics that conform, while the value 1 indicates that the objects are precisely identical. If the combination with the highest degree of matching, for the object and a previous object, exceeds a predetermined value, it is determined in a determination step 220 that there is a match. In the matching step 160 a decision is taken concerning a number of characteristics of the object, which characteristics are also weighted according to their importance. A method that increases the probability of a correct matching is to extract the intensity regions within an object. The method is based on segmenting an area based on one of its intensity characteristics. The different segments have an average intensity and a specified area. Different methods can be used for the segmentation itself. Examples of such methods are quantifying of the intensities, refining of the intensities or classification of different pattern segments by means of, for example, Bayer's classification about which more can be read in R. C. Gonzales, R. E. Woods, "Digital Image Processing", Addison Wesley. The different segments can then be saved efficiently in various ways. One way is to save the outlines of the different segments or carry out a Run Length Encoding (RLE) of the different segments as a pixel map.

In the classification step 170 the object is classified based on the object's history and characteristics, based on which the decision engine can determine whether the object is an alarm object or not. For each recorded image the decision engine has access to all the objects and their histories which were extracted from the image. Initially, the decision engine views the whole history of the different objects and determines from this whether it is a human alarm object. It is sufficient for an object to have been an alarm object at some time during its history for this to give rise to an alarm situation for the rest of its life. The object must fulfil a number of criteria in order to be classified or a decision reached concerning its being an alarm object. In order to achieve a particular level of confidence, for example, its history must be sufficient. For example, it can be determined that in order to cause an alarm a particular object must have been followed for at least 10 images back in time. Other criteria for classifying the object as an alarm object can be that for the whole of its life it covered a certain minimum distance and had a top speed which is not less than a certain lower limit.

If the object is classified as an alarm object, that is it is classified as a person whose behavior is not permitted, data representing the area in a stylized way is forwarded in a transmission step 180 via a communication cable 2 to an operator at a monitoring station 3 for display of the object in a display step 190. The transmission can be carried out at less than 10 kbit/s and still transmit a sufficiently large amount of information to make possible a verification of the alarm object. How many of the alarm object's characteristics are sent to the operator, and when, can be varied and determined by the users of the monitoring system.

If there are several objects in a recorded image, they are all investigated in the same way.

Figure 9A:
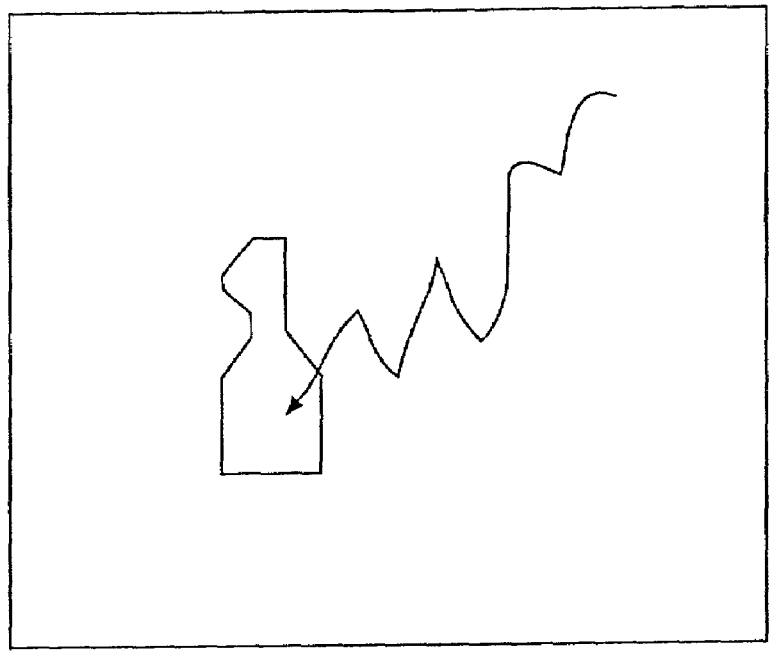
FIG. 9a shows an example of how an alarm object can be displayed to an operator.
Figure 9B:
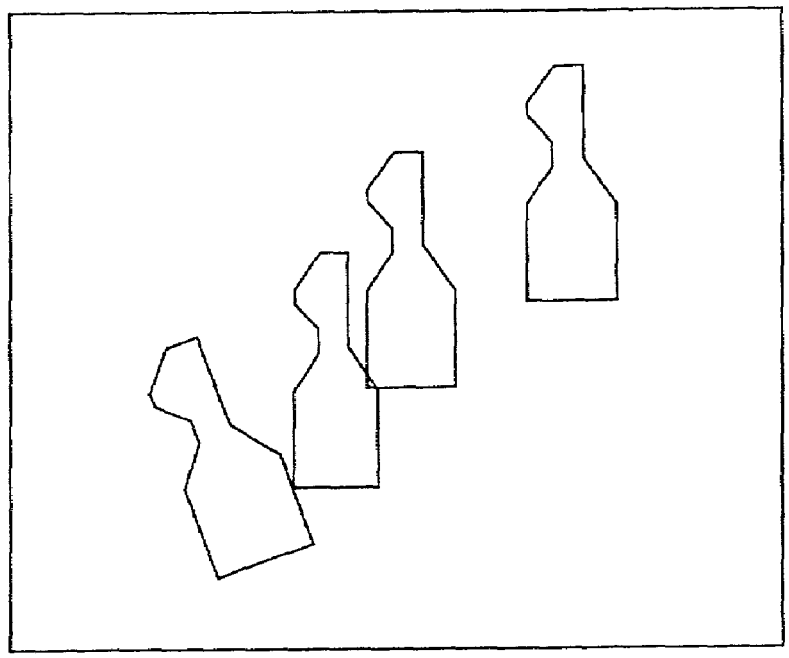
FIG. 9b shows another example of how an alarm object can be displayed to the operator.

What is transmitted and displayed to the operator in the display step 190 is the outline of the area. The outline can be displayed as an animation corresponding to the recorded object in recordings made consecutively in time. FIG. 9a shows one alternative for displaying the object to the operator. This shows the object's present outline and a series of previous outlines which show how the object has moved based on previously recorded images. FIGS. 9b shows a further alternative for the display to the operator. The outline of the object shows where the object has been situated in different recordings.

In addition, data which represents the line content of an object can be sent together with the outline shape. The main aim of visualizing the line content in the area is to give the visual display of the transmitted information of the object more structure and essential information about the nature of its texture. There are a number of different sets of lines that can be extracted from a texture. Edges can be refined out of the derived texture. The whole area of the object can be made thinner and in this way a kind of "stickman" is obtained. This stickman is quite sensitive to local changes and is therefore not always suitable. In addition, it originates from the outline and not from the texture. The texture can be regarded as a topography. A set of lines can be all the hilltops that can be described purely mathematically as, for example, saddle points and local maximums and minimums, etc. The lines are usually not particularly thin, but often have some form of width. In order to obtain narrow distinct lines, a method can be used that is called "thinning". Thinning "eats away" the edges of the thick lines without them being "eaten away" completely. Expressed simply, all the lines are made equally narrow (usually 1 pixel in width). In certain cases, the result is not a number of individual lines, but more of a grid. Then all the partial lines can be regarded as separate lines and separated from the other lines. In order to make the visual result as clear as possible, it can sometimes be necessary to weed out the information. For example, if there is a checked shirt in the texture, there can be quite a lot of lines clustered together. The weaker lines or some of those which are too close together can then advantageously be removed. Finally, the lines can be represented in a number of different ways. One way is in the form of pixels. Each line is described by the set of pixels it contains. Another way is line sequences. A line sequence is fitted to each line segment. Each line is represented here by a series of straight lines which together approximate to the original line. A further way is in the form of a spline. A spline is fitted to the line in question.

In addition, intensity regions can be sent with both the outline shape and the line content or only with the outline shape in order to make easier a visual evaluation which, for example, takes place in this case when the outline shape is displayed to the operator. The intensity regions are to reproduce as closely as possible the characteristic features of an object. In order to achieve a good segmentation it is first necessary to define which characteristics of the texture of the object belong together. Examples of such characteristics can be that the whole area is to have the same intensity with only small deviations. Another characteristic can be that the variance of the area is to be less than a particular measurement. A further characteristic can be that the area has a particular set of statistical characteristics such as average value, variance, correlation between adjacent pixels, etc. There are different ways of segmenting the different areas. In order to segment the different areas with the characteristics as mentioned above, a number of different methods can be used. One way is "Split and Merge" which is an algorithm that successively divides an area into smaller areas until the various partial areas fulfil a particular requirement. Subsequently the areas which have the same characteristics are combined.

Another way can be quantifying the area at a low bit-depth to give distinct regions. A further way is to plant a seed in the texture and to let this area grow as long as the new pixel conforms with the characteristics of the new area. Pixels are marked as allocated when they are included in an area. When an area cannot grow any larger, then this area is completed and a new seed is planted in another location. It is also possible to have a plurality of seeds growing at the same time in parallel. Another way can be Bayes classification according to a number of selected region characteristics in the texture.

In order to represent the different regions, a number of different methods can be used. A first method is "Run Length Encoding" (RLE) of the different regions' pixels. The value of the different pixels is which area they belong to. Another method is polygon representation. This method fits a polygon to the area. The polygon can share points with other areas and with the outline of the object. A further method is spline representation which delimits the area by a spline. An advantage is that the amount of data is smaller and the fit is better. A disadvantage is, however, that most spline methods cannot share common points and that the fitting is more calculating-intensive.

Once the regions and the lines have been represented, it is only a set of data that is sent via a transmission medium. The only restriction is that both the transmitter and the receiver, which in this case are the monitoring module 1 and the monitoring station 3, must interpret the information in the same way. They must have the same model of the information.

Figure 10:
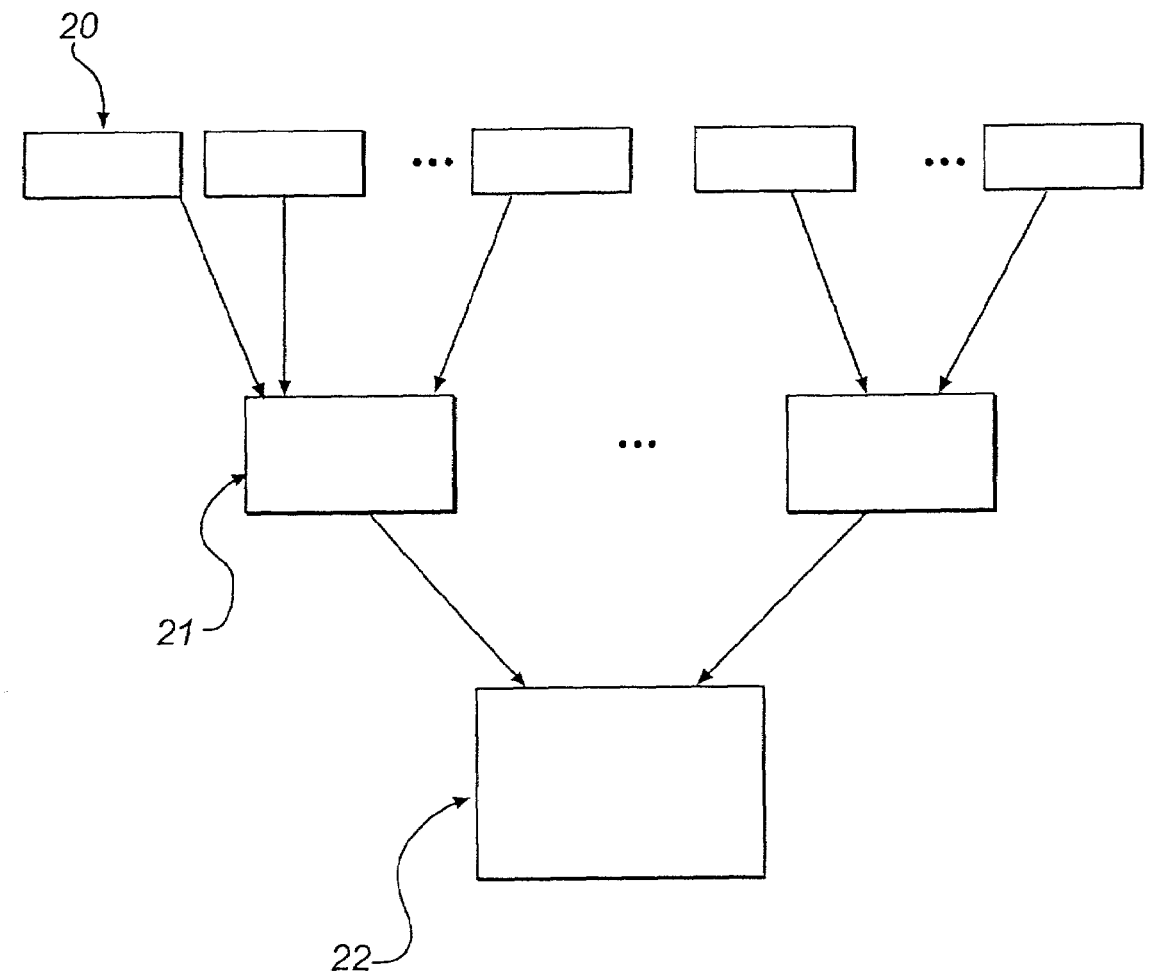
FIG. 10 shows the monitoring system according to an embodiment of the invention.

With reference to FIG. 10, a further embodiment according to the invention will now be described. A number of monitoring modules 20 are arranged at suitable locations in a building. These monitoring modules 20 are connected by wireless means to a central panel 21 which is arranged at the entrance to the building. By means of the central panel 21 the alarm in the building can be activated and de-activated. The central panel 21 is in turn in wireless communication with a monitoring station 22. The monitoring station 22 has a number of central panels 21 connected to it. Each monitoring module 20 continually records images of the location it is monitoring. An image recorded in a monitoring module 20 is compared in the monitoring module 20 with a reference image and any divergence areas are extracted. When a divergence area has been extracted, an object is derived with associated characteristics such as the object's size, shape, direction of movement and speed. The direction of movement and the speed can be derived according to the above-mentioned technology. The outline shape of the object is also derived according to the above-mentioned technology. The object is classified in the monitoring module 20 based on its characteristics. If the person moves in a particular direction at a particular speed, the person is said to constitute an alarm object. If the object is classified as an alarm object, data about the outline shape and data about the object's direction of movement and speed are transmitted to the central panel 21. The central panel 21 is arranged to add information about the date, time and in which monitoring module the alarm occurred. The data now contains the outline shape, direction of movement, speed of movement, date, time and information about which monitoring module 20 gave the alarm. No processing of the recorded alarm object is carried out in the central panel 21. The said data is now forwarded to the monitoring station 22. The monitoring station 22 comprises monitors which are monitored by alarm operators. The received outline shape is shown on the monitors and also the direction and speed of the object by means of arrows. The date, time and from which monitoring module 20 the alarm came are also shown on the monitors. The alarm operator can now reach a decision regarding appropriate further measures. If a monitoring module 20 is put out of action for any reason, for example by sabotage, the central panel 21 sends information about this to the monitoring station 22, which can then put the fault right.

Even though a special embodiment of the invention has been described above, it will be obvious to a person skilled in the art that many alternatives, modifications and variations are possible in the light of the above description. Communication can take place via radio, for example GSM or Bluetooth. Instead of the outline shape, for example, other types of stylized information about the object can be transmitted which make it possible for the operator to see what the transmitted data representing the object represents. For example, the skeleton form of the object can be transmitted or some type of information where the object is filled in so that its shape can be displayed visually.

What we claim and desire to secure by Letters Patent is:

1. A method of monitoring monitored locations by means of a monitoring system comprising a plurality of separate monitoring modules, each of which has a light-sensitive sensor, for monitoring the monitored locations, and a monitoring station comprising the steps of:
   recording within each of the plurality of monitoring modules an image of the monitored location associated with the plurality of monitoring module,
   extracting within each of the plurality of monitoring modules an area in the recorded image that differs from a reference image,
   extracting within each of the plurality of monitoring modules an object from the area,
   classifying within each of the plurality of monitoring modules the object based on characteristics, such as a characteristic of the type: size, shape and/or movement history, associated with the object, if the object is a human alarm object,
   transmitting, only if the object is classified as a human alarm object, data representing only the extracted area of the image in a stylized way, the stylized way representing a recognizable human shape, to the monitoring station, and
   recreating said transmitted data in the monitoring station and displaying the same to the operator for verification of the human alarm object.

2. A method according to claim 1, in which the method further comprises the step of creating the outline shape of the area in order to represent the object in a stylized way.

3. A method according to any one of claim 1 or 2, in which the stylized area is a stylized outline shape.

4. A method according to claim 1, further comprising the step of comparing particular characteristics associated with the object with corresponding characteristics associated with an object extracted from a previously recorded image, in which case if the characteristics conform to the extent that they can be considered to belong to the same object, data is recorded about the movement history of the object for classification and/or transmission to the monitoring station to be recreated and displayed to the operator.

5. A method according to claim 1, further comprising the steps, if the object is classified as a human alarm object, of transmitting supplementary alarm information about the area such as information of the type: intensity regions and/or line content together with data representing the area in a stylized way and of recreating and displaying the transmitted supplementary alarm information.

6. A monitoring system for monitoring monitored locations, comprising a plurality of separate monitoring modules, each of the plurality of monitoring modules having a light-sensitive sensor for recording images of the monitored locations, and a remote monitoring station, the plurality of monitoring modules being arranged to carry out computer-based analysis of the images, which comprises extracting areas from the images that differ from a reference image, extracting an object from the area, classifying the object based on characteristics, such as a characteristic of the type: size, shape and/or movement history, associated with the object, and only if the object is classified as a human alarm object, transmitting data representing only the extracted area of the image in a stylized way, the stylized way representing a recognizable human shape, to the monitoring station which is arranged to recreate and display said transmitted data to the operator for verification of the human alarm object.

7. A monitoring system according to claim 6, further comprising a central panel which is arranged to receive said data representing the area in a stylized way from at least a subset of the monitoring modules, and to forward this data together with supplementary data, such as data of the type: date, time and information about from which monitoring module said data was received, to the monitoring station.

8. A monitoring system according to claim 6 or 7, in which the monitoring modules and the monitoring station are arranged to communicate by wireless means, such as by mobile telephony.

9. A monitoring module for monitoring a monitored location, which comprises a memory, a light-sensitive sensor for recording an image of the monitored location, and a communication device for communication with an external unit and a calculating unit for detecting a moving object from the recorded information, which monitoring module is arranged to carry out computer-based analysis of the image, which comprises extracting an area from the image that differs from a reference image, extracting an object from the area, classifying the object based on characteristics, such as a characteristic of the type: size, shape and/or movement history, associated with the object, and, only if the object is classified as a human alarm object, transmitting data representing only the extracted area of the image in a stylized way to an external unit, the stylized way representing a recognizable human shape.

10. A monitoring module according to claim 9, in which the memory is arranged to store a particular type of movement information for learning purposes.

11. A monitoring module according to claim 9 or 10, in which the monitoring module comprises a supplementary sensor.

* * * * *

UNITED STATES PATENT AND TRADEMARK OFFICE
CERTIFICATE OF CORRECTION

PATENT NO.         : 7,479,980 B2                                      Page 1 of 1
APPLICATION NO.    : 09/746776
DATED              : January 20, 2009
INVENTOR(S)        : Christian Merheim et al.

It is certified that error appears in the above-identified patent and that said Letters Patent is hereby corrected as shown below:

On the title page, item [73] should read: --Secumanagement B.V--

Signed and Sealed this

Twenty-second Day of December, 2009

David J. Kappos
*Director of the United States Patent and Trademark Office*